(12) United States Patent
Sakai et al.

(10) Patent No.: US 8,795,894 B2
(45) Date of Patent: Aug. 5, 2014

(54) POSITIVE ELECTRODE ACTIVE MATERIAL, SODIUM SECONDARY BATTERY, AND PRODUCTION METHOD OF OLIVINE-TYPE PHOSPHATE

(75) Inventors: Maiko Sakai, Tsukuba (JP); Taketsugu Yamamoto, Tsukuba (JP); Masami Makidera, Tsukuba (JP); Satoru Kuze, Tsukuba (JP); Takeshi Hattori, Abiko (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 753 days.

(21) Appl. No.: 12/864,715

(22) PCT Filed: Jan. 23, 2009

(86) PCT No.: PCT/JP2009/051097
§ 371 (c)(1),
(2), (4) Date: Jul. 27, 2010

(87) PCT Pub. No.: WO2009/096335
PCT Pub. Date: Aug. 6, 2009

(65) Prior Publication Data
US 2010/0323231 A1    Dec. 23, 2010

(30) Foreign Application Priority Data
Jan. 28, 2008 (JP) ................. 2008-016814

(51) Int. Cl.
*H01M 4/52* (2010.01)
*C01B 25/30* (2006.01)

(52) U.S. Cl.
USPC .......................... 429/221; 423/312

(58) Field of Classification Search
USPC ........... 429/121–347; 423/304–305, 311–312
See application file for complete search history.

(56) References Cited

U.S. PATENT DOCUMENTS 5,910,382 A    6/1999  Goodenough et al.
6,447,958 B1 *  9/2002  Shinohara et al. ............ 429/248
(Continued)

FOREIGN PATENT DOCUMENTS

JP    9-134724 A    5/1997
JP    10-324758 A   12/1998
(Continued)

OTHER PUBLICATIONS

Burba et al. "Vibrational spectroscopic investigation of structurally-related LiFePO4, NaFePO4, and FePO4 compounds." Spectrochimica Acta Part A: Molecular and Biomolecular Spectroscopy 65.1 (2006): 44-50.*

(Continued)

*Primary Examiner* — Kenneth Douyette
*Assistant Examiner* — James Lee
(74) *Attorney, Agent, or Firm* — Sughrue Mion, PLLC

(57) ABSTRACT

Disclosed are a positive electrode active material and a method for producing an olivine-type phosphate. The positive electrode active material comprises an olivine-type phosphate represented by the following formula (I), wherein the maximum peak in an X-ray diffraction pattern obtained using a CuKα ray is the peak of the (031) plane of the olivine-type phosphate and the half-value width of the peak is 1.5° or less: $A_aM_bPO_4$ (I), wherein A represents one or more elements selected from among alkali metals; M represents one or more elements selected from among transition metals; a is from 0.5 to 1.5; and b is from 0.5 to 1.5. The method for producing an olivine-type phosphate comprises preparing a raw material comprising element A, element M, and phosphorus (P) so that a A:M:P molar ratio may be a:b:1, preliminary calcining the raw material, and mainly calcining the preliminary calcined raw material.

9 Claims, 7 Drawing Sheets

(56) References Cited

U.S. PATENT DOCUMENTS 6,872,492 B2    3/2005   Barker et al.
2002/0192553 A1*  12/2002  Barker et al. .......... 429/224
2008/0131777 A1   6/2008   Hatta et al.

FOREIGN PATENT DOCUMENTS

| JP | 2000-030686 A | | 1/2000 | | |
|---|---|---|---|---|---|
| JP | 2000-509193 A | | 7/2000 | | |
| JP | 2000-294238 A | | 10/2000 | | |
| JP | 2001-338694 A | | 12/2001 | | |
| JP | 2003-157850 A | | 5/2003 | | |
| JP | 2004-533706 A | | 11/2004 | | |
| JP | 2006-269350 A | | 10/2006 | | |
| JP | 2008-260666 | * | 10/2008 | .............. | C01B 25/45 |

WO    2005/041327 A1    5/2005

OTHER PUBLICATIONS

Okada et al. JP 2008-260666. Oct. 30, 2008. English machine translation.*

John N. Bridson et al., "Synthesis and Crystal Structure of Maricite and Sodium Iron(III) Hydroxphosphate", Chem. Mater., 1998, pp. 763-768, vol. 10.

Yvon Le Page et al., "The Crystal Structure of the New Mineral Maricite, $N_aF_ePO_4$", Canadian Mineralogist, 1977, pp. 518-521, vol. 15.

Japanese Office Action issued Jun. 18, 2013 by the Japanese Patent Office in corresponding JP Application No. 2009-011335.

English Translation of Japanese Office Action issued in corresponding JP Application No. 2009-011335, dated Jun. 18, 2013.

* cited by examiner

×13,000　　　　　　　1 μm

×100　　　　　　　100 μm

POSITIVE ELECTRODE ACTIVE MATERIAL, SODIUM SECONDARY BATTERY, AND PRODUCTION METHOD OF OLIVINE-TYPE PHOSPHATE

TECHNICAL FIELD

The present invention relates to a positive electrode active material, particularly a positive electrode active material for secondary batteries, which is an olivine-type phosphate capable of being doped and dedoped with alkali metal ions, and a secondary battery using this positive electrode active material. The present invention also relates to a production method of an olivine-type phosphate.

BACKGROUND ART

A positive electrode active material is used for the positive electrode of batteries. The batteries in general can be classified into two groups. These are a "primary battery" in which the electrochemical reaction is substantially irreversible and which cannot be used any more when once discharged, and a "secondary battery" in which the electrochemical reaction is reversible to enable "recharging" and which can be used a plurality of times. The characteristic feature of the secondary battery includes an environmental advantage thanks to decrease in the required replacement (i.e. decrease in waste), and this battery is used for various power sources.

Among secondary batteries, a lithium secondary battery has already been put into commercial use as a small power source for cellular phones, notebook computers and the like. Furthermore, a demand for a secondary battery as a large power source for electric vehicles, distributed power storages and the like is on the rise.

In the lithium secondary battery, a use of an olivine-type lithium iron phosphate ($LiFePO_4$) as a positive electrode active material has been proposed. For example, in Examples of Patent Document 1, an olivine-type lithium iron phosphate is obtained from ammonium dihydrogenphosphate ($NH_4H_2PO_4$), iron oxalate dihydrate ($FeC_2O_4 \cdot 2H_2O$) and lithium carbonate.

In order to eliminate the use of lithium used in the lithium secondary battery, it is considered to obtain a sodium secondary battery by using sodium which is one digit cheaper than lithium, abundant as a resource, and lightweight, and has a relative high standard potential. A use of a sodium secondary battery in place of the existing lithium secondary battery enables mass-production of a large secondary battery for electric vehicles, distributed power storages and the like, without fear of depletion of resources. More specific examples of the sodium secondary battery include a secondary battery using a sodium-containing positive electrode active material for the positive electrode and using metal sodium or sodium alloy for the negative electrode, and a secondary battery using a sodium-containing positive electrode active material for the positive electrode and using a carbonaceous material or the like for the negative electrode.

As regards a positive electrode active material used for the positive electrode of the sodium secondary battery, a positive electrode active material mainly composed of an olivine-type phosphate represented by the formula $Na_aM_bPO_4$ (M is Mn, Fe, Co or the like) has been proposed. Synthesis of an olivine-type sodium iron phosphate by the following scheme is described, for example, in Patent Document 2.

(1) Thermal Carbonization Solid-Phase Synthesis

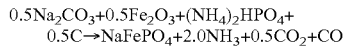

(2) Solid-Phase Synthesis Method

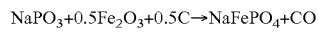

Patent Document 2 indicates that, in both of the schemes (1) and (2), the carbon amount is about 100 wt % excess to the stoichiometric chemical reaction.

Patent Document 1: Japanese Unexamined Japanese Publication No. 2000-294238

Patent Document 2: Japanese National Patent Publication No. 2004-533706

DISCLOSURE OF THE INVENTION

Problems to be Solved by the Invention

As described above, the production method of a positive electrode active material mainly composed of an olivine-type phosphate represented by the formula $A_aM_bPO_4$ has been proposed in conventional techniques. However, a high-crystallinity olivine-type phosphate cannot be obtained by the conventional technique, and it has been difficult to obtain a positive electrode active material for a practically tolerable battery. Also, an olivine-type sodium iron phosphate ($NaFePO_4$) having high crystallinity naturally occurs as a mineral (maricite), but this mineral is not only expensive due to its considerable scarcity, but also contains impurities such as magnesium, manganese and calcium, and its use as a positive electrode active material for a practically tolerable battery is infeasible. Accordingly, the present invention is based on the object of providing a positive electrode active material for a practically tolerable battery, and provides a production method of an olivine-type phosphate having high crystallinity, and a positive electrode active material containing such a high-crystallinity olivine-type phosphate. The present invention also provides a positive electrode for sodium secondary batteries and a sodium secondary battery, each using the positive electrode active material above.

Means to Solve the Problems

The present inventors have continued intensive studies to attain the above-described object and accomplished the present invention. That is, the present invention is as follows.

(1) A positive electrode active material comprising an olivine-type phosphate represented by the following formula (I), wherein the maximum peak of the positive electrode active material in an X-ray diffraction pattern obtained using a $CuK\alpha$ ray is the peak of the (031) plane of the olivine-type phosphate, and the half-value width of the peak is 1.5° or less:

wherein A represents one or more elements selected from among alkali metals, M represents one or more elements selected from among transition metals, a is from 0.5 to 1.5, and b is from 0.5 to 1.5.

(2) The positive electrode active material as described in (1) above, wherein A comprises at least sodium and M comprises at least iron.

(3) The positive electrode active material as described in (2) above, wherein A is sodium and M is iron.

(4) The positive electrode active material as described in (3) above, wherein the positive electrode active material has a peak at $2\theta=34.8°$ in an X-ray diffraction pattern obtained using a $CuK\alpha$ ray, and an $I/I_0$ value is 0.5 or less where the signal intensity at said peak is $I_0$ and the signal intensity at $2\theta=34.2°$ is I.

(5) A positive electrode for sodium secondary batteries, comprising the positive electrode active material as described in any one of (2) to (4) above.

(6) A sodium secondary battery comprising the positive electrode for sodium secondary batteries as described in (5) above.

(7) The sodium secondary battery as described in (6) above further comprising a negative electrode comprising a mixture of a carbonaceous material and a binder.

(8) The sodium secondary battery as described in (6) or (7) above further comprising a separator.

(9) The sodium secondary battery as described in (8) above, wherein the separator is a separator comprising a porous laminate film in which a heat-resistant porous layer comprising a heat-resistant resin and a porous film comprising a thermoplastic resin are laminated.

(10) A method for producing an olivine-type phosphate represented by the following formula (I):

$$A_aM_bPO_4 \qquad (I)$$

wherein A represents one or more elements selected from among alkali metals, M represents one or more elements selected from among transition metals, a is a from 0.5 to 1.5, and b is from 0.5 to 1.5, the method comprising:
preparing a raw material comprising element A, element M and phosphorus (P) so that a A:M:P molar ratio may be a:b:1;
subjecting the raw material to preliminary calcination; and
subjecting the preliminarily calcined raw material to main calcination.

(11) The method as described in (10) above further comprising pulverizing the preliminarily calcined raw material between the preliminary calcination and the main calcination.

(12) The method as described in (10) or (11) above, wherein the main calcination is carried out at a temperature higher than that of the preliminary calcination.

(13) The method as described in any one of (10) to (12) above, wherein M comprises at least iron, and at least iron carboxylate is used as the raw material of iron.

(14) The method as described in (13) above, wherein the raw material for the preliminary calcination comprises sodium carbonate ($Na_2CO_3$), iron oxalate dihydrate ($FeC_2O_4 \cdot 2H_2O$), and diammonium hydrogenphosphate (($NH_4)_2HPO_4$).

(15) The method as described in any one of (10) to (14) above, wherein the preliminary calcination and the main calcination are carried out in an inert atmosphere and the raw material does not contain carbon as a reducing agent.

As described above, according to the present invention, a sodium secondary battery includes a secondary battery using a sodium-containing positive electrode active material for the positive electrode and using metal sodium or sodium alloy for the negative electrode, and a secondary battery using a sodium-containing positive electrode active material for the positive electrode and using a carbonaceous material or the like for the negative electrode, and these are collectively referred to as a sodium secondary battery.

BEST MODE FOR CARRYING OUT THE INVENTION

Figure 1:
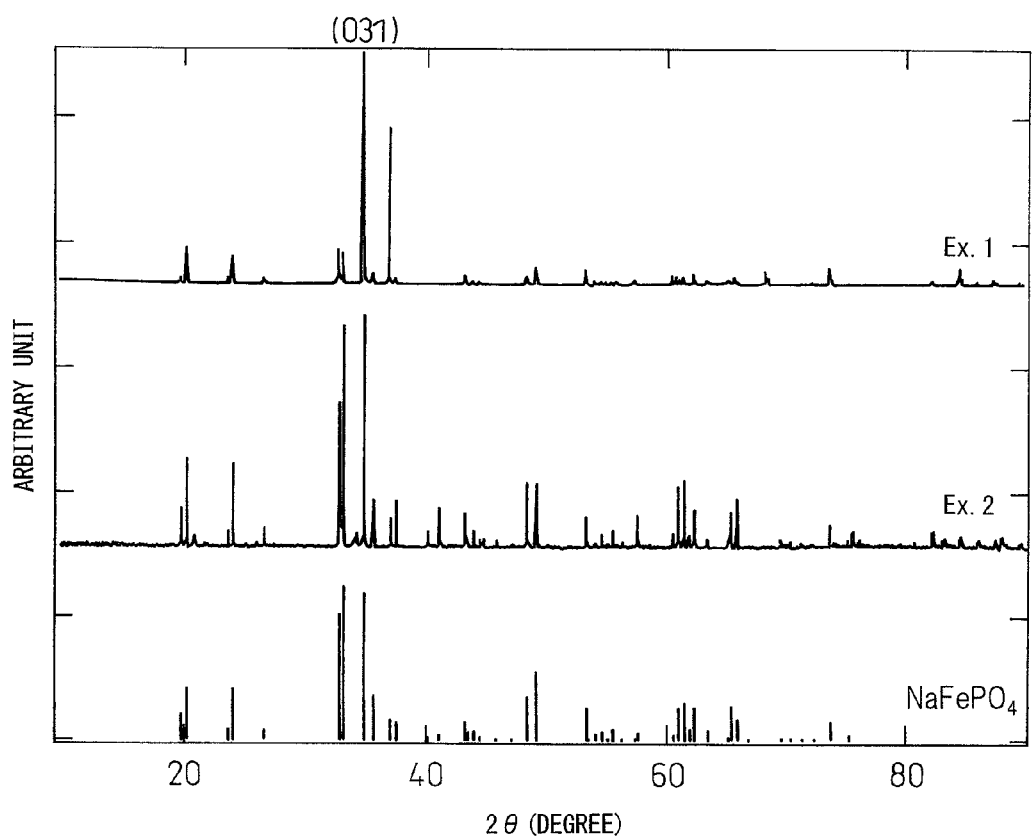
FIG. 1 X-ray diffraction patterns of the positive electrode active materials in Examples 1 and 2.

The present invention is described in detail below.
<Positive Electrode Active Material of the Invention>

The positive electrode active material of the present invention comprises an olivine-type phosphate represented by the following formula (I), wherein the maximum peak of the positive electrode active material in an X-ray diffraction pattern obtained using a CuKα ray is the peak of the (031) plane of the olivine-type phosphate and the half-value width of the peak is 1.5° or less:

$$A_aM_bPO_4 \qquad (I)$$

wherein A represents one or more elements selected from among alkali metals, M represents one or more elements selected from among transition metals, a is from 0.5 to 1.5, and b is from 0.5 to 1.5.

In the positive electrode active material of the present invention, the peak of the (031) plane in the X-ray diffraction pattern of the olivine-type phosphate of formula (I) is the maximum peak in the X-ray diffraction pattern of the phosphate, and the half-value width of the peak is small, which means that the crystallinity of the phosphate is high. In the present invention, the half-value width is 1.5° or less, preferably 1.0° or less, more preferably 0.5° or less, still more preferably 0.1° or less. Also, this half-value width is usually 0.01° or more. Incidentally, in the case of olivine-type sodium iron phosphate ($NaFePO_4$), the peak of the (031) plane appears in the vicinity of 2θ=34.8°. In the present invention, the half-value width means the full width at half maximum (FWHM).

In formula (I), A represents one or more elements selected from among alkali metals, for example, one or more elements selected from the group consisting of lithium (Li), sodium (Na) and potassium (K), particularly one or more elements selected from lithium and sodium, and more particularly sodium.

In formula (I), M represents one or more elements selected from among transition metals, for example, one or more elements selected from the group consisting of vanadium (V), manganese (Mn), iron (Fe), cobalt (Co), copper (Cu) and nickel (Ni), particularly one or more elements selected from the group consisting of iron, manganese and nickel, which are advantageous in view of cost, and more particularly iron. Accordingly, for example, A may comprise at least sodium and M may comprise at least iron, and particularly, A may be sodium and M may be iron.

In formula (I), a is from 0.5 to 1.5, for example, from 0.8 to 1.2, particularly about 1, and b is from 0.5 to 1.5, for example, from 0.8 to 1.2, particularly about 1.

In formula (I), in the case where A comprises at least sodium and M comprises at least iron, the positive electrode active material can be preferably used as a positive electrode active material for sodium secondary batteries. For this purpose, it is more preferred that in formula (I), A be sodium and M be iron.

In one embodiment of the positive electrode active material of the present invention in which A is sodium and M is iron in formula (I), the positive electrode active material has a peak at $2\theta=34.8°$ in the X-ray diffraction pattern obtained using a CuK$\alpha$ ray, and an $I/I_0$ value is 0.5 or less, for example, 0.3 or less, preferably 0.1 or less, and more preferably 0 where the signal intensity at said peak is $I_0$ and the signal intensity at $2\theta=34.2°$ is I.

The signal intensity ($I_0$) of the peak at $2\theta=34.8°$ represents the signal intensity of the maximum peak (the peak of the (031) plane) in the X-ray diffraction pattern of olivine-type sodium iron phosphate (NaFePO$_4$), obtained using a CuK$\alpha$ ray, and the signal intensity (I) at $2\theta=34.2°$ represents the amount of impurities. Accordingly, a small $I/I_0$ value indicates that the crystallinity of this positive electrode active material is high.

The olivine-type phosphate used for the positive electrode active material of the present invention can be obtained by the method of the present invention for producing an olivine-type phosphate.

<Method of the Present Invention for Producing Olivine-Type Phosphate>

The method of the present invention relates to a method for producing an olivine-type phosphate represented by the following formula (I):

$$A_aM_bPO_4 \quad (I)$$

wherein A represents one or more kinds of elements selected from among alkali metals, M represents one or more elements selected from among transition metals, a is from 0.5 to 1.5, and b is from 0.5 to 1.5.

This method of the present invention comprises the following steps:
preparing a raw material comprising element A, element M and phosphorus (P) so that a A:M:P molar ratio may be a:b:1;
subjecting the raw material to preliminary calcination; and
subjecting the preliminarily calcined raw material to main calcination.

According to the method of the present invention, an olivine-type phosphate having high crystal purity can be obtained. In particular, according to the method of the present invention, an olivine-type phosphate used for the positive electrode active material of the present invention can be obtained.

In formula (I), A represents one or more elements selected from among alkali metals, for example, one or more elements selected from the group consisting of lithium (Li), sodium (Na) and potassium (K), particularly one or more elements selected from lithium and sodium, and more particularly sodium.

In formula (I), M represents one or more elements selected from among transition metals, for example, one or more elements selected from the group consisting of vanadium (V), manganese (Mn), iron (Fe), cobalt (Co), copper (Cu) and nickel (Ni), particularly one or more elements selected from the group consisting of iron, manganese and nickel, which are advantageous in view of cost, and more particularly iron. Accordingly, for example, A may comprise at least sodium and M may comprise at least iron, and particularly A may be sodium and M may be iron.

In formula (I), a is from 0.5 to 1.5, for example, from 0.8 to 1.2, particularly about 1, and b is from 0.5 to 1.5, for example, from 0.8 to 1.2, particularly about 1.

In formula (I), in the case where A comprises at least sodium and M comprises at least iron, an olivine-type phosphate preferably usable as a positive electrode active material for sodium secondary batteries can be obtained by the production method above. For this purpose, it is more preferred that in formula (I), A be sodium and M be iron.

<Method of the Present Invention for Producing Olivine-Type Phosphate/Raw Material>

As for the raw material comprising element A that is one or more elements selected from among alkali metals, any raw material comprising element A can be used. For example, an oxide of element A, a salt such as carbonate of element A and hydrogencarbonate of element A, and a hydroxide of element A can be used, and particularly, a carbonate of element A can be used. Accordingly, for example, when element A is sodium, an oxide such as Na$_2$O and Na$_2$O$_2$; a salt such as Na$_2$CO$_3$, NaNO$_3$ and NaHCO$_3$; and a hydroxide such as NaOH can be used, and particularly, Na$_2$CO$_3$ can be used.

As for the raw material comprising element M that is one or more elements selected from among transition metals, any raw material comprising element M can be used, and particularly, a raw material comprising a divalent element M can be used. For obtaining an olivine-type phosphate having high crystal purity, the raw material comprising element M is preferably a carbonate of element M or carboxylate of element M, such as formate, acetate, propionate, oxalate, malonate or succinate, particularly an oxalate. Use of such a carbonate or carboxylate is preferred also in view of allowing for no generation of an acidic gas at the synthesis reaction. Of course, the carboxylate may be a hydrate. Accordingly, when element M is iron, an iron carboxylate such as iron oxalate dihydrate (FeC$_2$O$_4$.2H$_2$O) can be used.

As for the raw material comprising phosphorus, any raw material comprising phosphorus can be used, and examples thereof include a phosphate. Specific examples of the phosphate include an ammonium salt of phosphoric acid, such as diammonium hydrogenphosphate and ammonium dihydrogenphosphate. For obtaining an olivine-type phosphate having high crystal purity, diammonium hydrogenphosphate ((NH$_4$)$_2$HPO$_4$) is preferred.

The preferred combination of the raw materials comprising element A, element M and phosphorus for use in the method of the present invention includes a combination of sodium carbonate (Na$_2$CO$_3$), iron oxalate dihydrate (FeC$_2$O$_4$.2H$_2$O) and diammonium hydrogenphosphate ((NH$_4$)$_2$HPO$_4$).

The raw materials comprising element A, element M and phosphorus for use in the method of the present invention can be homogenized by any mixing step, and this can be attained, for example, by a dry mixing step or a wet mixing step. In particular, a dry mixing step is simple and preferred. The mixing step may be carried out by a dry mixing step usually employed in industry. For example, a mortar, a V-type mixer, a W-type mixer, a ribbon mixer, a drum mixer and a dry ball mill can be used.

<Method of the Present Invention for Producing Olivine-Type Phosphate/Preliminary Calcination>

The preliminary calcination can be carried out, for example, at from 350° C. to 1,200° C., particularly from 350° C. to 950° C., more particularly from 400° C. to 800° C. The preliminary calcination may be carried out by keeping at this temperature, for example, over from 2 hours to 30 hours, preferably from 4 hours to 8 hours. At the preliminary calcination, it is sometimes preferred that the temperature be raised to reach the above-described preliminary calcination temperature rapidly, within the extent not breaking the calcination vessel in which a raw material is placed, that is, for example, at a temperature rise rate of 5° C./min or more.

The preliminary calcination is preferably carried out in an inert or non-oxidizing atmosphere such as nitrogen gas or argon gas atmosphere. Also, it is preferred that the preliminary calcination be carried out in an inert atmosphere or a non-oxidizing atmosphere, and a raw material to be calcined by preliminary calcination should not contain carbon as a reducing agent, because a gas difficult to handle, such as carbon monoxide, is not generated.

<Method of the Present Invention for Producing Olivine-Type Phosphate—Pulverization Step>

The method of the present invention may optionally comprise a pulverization step between the preliminary calcination and the main calcination. This pulverization step can be carried out in any mode where the preliminarily calcined raw material can be, for example, pulverized, refined and homogenized. This step may be carried out, for example, by the pulverization usually employed in industry. Pulverization includes those using a mortar or a pulverizer such as vibration mill, jet mill and dry ball mill. If desired, an operation of a classification such as air classification may be carried out. This pulverization step is considered to be useful also for more uniformly mixing element A, element M and phosphorus in the preliminarily calcined raw material.

<Method of the Present Invention for Producing Olivine-Type Phosphate/Main Calcination>

The main calcination can be carried out at a temperature of from 500° C. to 1,200° C., particularly from 500° C. to 1,000° C., and more particularly from 700° C. to 900° C. Also, the main calcination can be carried out at a temperature higher than the temperature in the preliminary calcination, for example, at a temperature higher by 10° C. to 500° C., particularly by 30° C. to 400° C., than the temperature in the preliminary calcination. The main calcination can be carried out by keeping at this temperature, for example, over from 2 hours to 30 hours, and preferably from 4 hours to 8 hours. At the main calcination, it is sometimes preferred that the temperature be raised to reach the above-described calcination temperature rapidly, within the extent not breaking the calcination vessel in which a raw material is placed, that is, for example, at a temperature rise rate of 5° C./min or more.

The main calcination is preferably carried out in an inert or non-oxidizing atmosphere such as nitrogen gas or argon gas atmosphere. Also, it is preferred that the main calcination be carried out in an inert atmosphere or a non-oxidizing atmosphere, and a raw material to be calcined by the main calcination should not contain carbon as a reducing agent, because a gas difficult to handle, such as carbon monoxide, is not generated.

<Method of the Present Invention for Producing Olivine-Type Phosphate/Steps after Calcination>

In the case where the olivine-type phosphate obtained by the method of the present invention is used as the positive electrode active material of the present invention, particularly as a positive electrode active material for sodium secondary batteries, it is sometimes preferred to adjust the particle size by optionally subjecting the obtained olivine-type phosphate to, for example, pulverization by means of a ball mill, a jet mill or the like, washing and classification. Incidentally, after the main calcination, with or without further involving an intermediate pulverization step, an additional calcination step may be carried out. The particle of the olivine-type phosphate may be surface-treated, for example, by coating the surface of the particle with an inorganic substance comprising Si, Al, Ti, Y or the like.

The above-described olivine-type phosphate can be used as a positive electrode active material for a practically tolerable battery, directly or after applying a surface treatment such as the coating.

<Positive Electrode for Sodium Secondary Batteries of the Present Invention and Production Method Thereof>

A positive electrode for sodium secondary batteries of the present invention comprises the positive electrode active material of the present invention. The positive electrode for sodium secondary batteries of the present invention can be produced by loading, on a positive electrode current collector, a positive electrode mixture comprising the positive electrode active material of the present invention, an electrically conductive material and a binder.

Examples of the electrically conductive material include a carbonaceous material, such as natural graphite, artificial graphite, coke, and carbon black. Examples of the binder include a thermoplastic resin, and specific examples thereof include a fluororesin, such as polyvinylidene fluoride (hereinafter referred to as "PVDF"), polytetrafluoroethylene, ethylene tetrafluoride-propylene hexafluoride-vinylidene fluoride-based copolymer, propylene hexafluoride-vinylidene fluoride-based copolymer, and ethylene tetrafluoride-perfluorovinyl ether-based copolymer; and a polyolefin resin, such as polyethylene and polypropylene. Examples of the positive electrode current collector include Al, Ni and stainless steel.

The method for loading a positive electrode mixture on a positive electrode current collector includes a method of pressure-molding the mixture, and a method of forming the positive electrode mixture into a paste by using an organic solvent or the like, applying and drying the paste on a positive electrode current collector, and fixing the mixture by pressing. In the case of forming a paste, a slurry comprising a positive electrode active material, an electrically conductive material, a binder and an organic solvent is prepared. Examples of the organic solvent include an amine-based solvent, such as N,N-dimethylaminopropylamine and diethyltriamine; an ether-based solvent, such as ethylene oxide and tetrahydrofuran; a ketone-based solvent, such as methyl ethyl ketone; an ester-based solvent, such as methyl acetate; and an aprotic polar solvent, such as dimethylacetamide and N-methyl-2-pyrrolidone. Examples of the method for applying a positive electrode mixture on a positive electrode current collector include a slit die coating method, a screen coating method, a curtain coating method, a knife coating method, a gravure coating method, and an electrostatic spraying method.

<Sodium Secondary Battery of the Present Invention>

A sodium secondary battery of the present invention has the positive electrode for sodium secondary batteries of the present invention. The sodium secondary battery of the present invention can be produced by stacking a separator, a negative electrode comprising a negative electrode current collector having loaded thereon a negative electrode mixture, and the positive electrode for sodium secondary batteries of the present invention; winding the stack to yield an electrode group; housing the electrode group in a battery can; and then impregnating the electrode group with an electrolytic solution composed of an organic solvent containing an electrolyte.

Examples of the shape of the electrode group include a shape that gives a cross section of a circular shape, an elliptical shape, an oval shape, a rectangular shape, a corner-rounded rectangular shape or the like, when the electrode group is cut in the direction perpendicular to the winding axis. Examples of the shape of the battery include a paper shape, a coin shape, a cylinder shape, and a square shape.

<Sodium Secondary Battery of the Present Invention/Negative Electrode>

A negative electrodes usable in the sodium secondary battery of the present invention include sodium metal, a sodium alloy, and a negative electrode obtained by loading, on a negative electrode current collector, a negative electrode mixture containing a negative electrode active material capable of being doped and dedoped with sodium ions. The negative electrode active material includes a carbonaceous material capable of being doped and dedoped with sodium ions, such as natural graphite, artificial graphite, coke, carbon black, pyrolytic carbons, carbon fiber and calcined organic polymer compound. The shape of the carbonaceous material may be any of a flake, such as that of natural graphite, a sphere, such as that of mesocarbon microbead, a fiber, such as that of graphitized carbon fiber, or an aggregate of fine powder.

As for the negative electrode active material capable of being doped and dedoped with sodium ions, a chalcogen compound, such as oxide and sulfide, capable of being doped and dedoped with sodium ions at a lower potential than a positive electrode may also be used.

The negative electrode mixture may comprise a binder, if necessary. Accordingly, the negative electrode of the sodium secondary battery of the present invention may be configured to comprise a mixture of a carbonaceous material and a binder. The binder includes a thermoplastic resin, and specific examples thereof include PVDF, thermoplastic polyimide, carboxymethyl cellulose, polyethylene and polypropylene.

Examples of the negative electrode current collector include Cu, Ni and stainless steel, and Cu is preferred because Cu is difficult to be an alloy with lithium or sodium, and is easily formed into a thin film. Examples of the method for loading a negative electrode mixture on a negative electrode current collector are the same as in the case of a positive electrode, and include a method of pressure-molding the mixture, and a method of forming the negative electrode mixture into a paste by using a solvent or the like, applying and drying the paste on a negative electrode current collector, and fixing the mixture by pressing.

<Sodium Secondary Battery of the Present Invention/Separator>

As for a separator usable in the sodium secondary battery of the present invention, a member having a form, such as porous film, nonwoven fabric and woven fabric and made of a material of a polyolefin resin, such as polyethylene and polypropylene, a fluororesin or a nitrogen-containing aromatic polymer can be used. A single-layer or multilayer separator using two or more of these materials may also be used. Examples of the separator include separators described in Japanese Unexamined Patent Publication Nos. 2000-30686 and 10-324758. A thickness of the separator is preferably smaller as long as the mechanical strength can be maintained, from the standpoint of increase in the volumetric energy density of a battery and decrease in internal resistance thereof. In general, a thickness of the separator is preferably about 5 to 200 µm, more preferably about 5 to 40 µm.

The separator preferably has a porous film comprising a thermoplastic resin. In a secondary battery, the separator is located between a positive electrode and a negative electrode. When an extraordinary current flows in the battery due to short-circuit between a positive electrode and a negative electrode, or the like, the separator preferably plays a role by which the current is blocked to prevent an overcurrent from flowing (to shutdown). The shutdown is achieved by clogging fine pores of the porous film of the separator when the temperature exceeds a usual use temperature. Even when the temperature in the battery rises to a certain high temperature after the shutdown, it is preferable that the separator maintain the shutdown state without being ruptured due to the temperature, in other words, have high heat resistance. This separator includes a porous film having a heat-resistant material such as a porous laminate film in which a heat-resistant porous layer and a porous film are laminated, preferably a porous laminate film in which a heat-resistant porous layer containing a heat-resistant resin and a film containing a thermoplastic resin are laminated. By using such a porous film having a heat-resistant material as a separator, the secondary battery of the present invention can be more successfully prevented from thermal film rupture. The heat-resistant porous layer can be laminated on both sides of the porous film.

<Sodium Secondary Battery of the Present Invention/Separator/Porous Laminate Film Separator>

The separator composed of a porous laminate film in which a heat-resistant porous layer and a porous film are laminated is described below. A thickness of the separator is usually 40 µm or less, preferably 20 µm or less. Assuming that a thickness of the heat-resistant porous layer is A (µm) and a thickness of the porous film is B (µm), the value of A/B is preferably from 0.1 to 1. Considering the ion permeability, the permeability of the separator is, in terms of Gurley permeability, preferably from 50 to 300 seconds/100 ml, more preferably from 50 to 200 seconds/100 ml. A void content of the separator is usually from 30 to 80 vol %, and preferably from 40 to 70 vol %.

(Heat-Resistant Layer)

In the porous laminate film, the heat-resistant porous layer preferably contains a heat-resistant resin. In order to elevate the ion permeability, a thickness of the heat-resistant porous layer is preferably from 1 to 10 µm, more preferably from 1 to 5 µm, and particularly preferably from 1 to 4 µm to be a thinner heat-resistant porous layer. The heat-resistant porous layer has fine pores, and the size (diameter) of the pore is usually 3 µm or less, preferably 1 µm or less. The heat-resistant porous layer may contain a filler described later. The heat-resistant porous layer may be formed from an inorganic powder.

The heat-resistant resin contained in the heat-resistant porous layer includes polyamide, polyimide, polyamideimide, polycarbonate, polyacetal, polysulfone, polyphenylene sulfide, polyether ketone, aromatic polyester, polyethersulfone and polyetherimide. From the standpoint of further enhancing the heat resistance, polyamide, polyimide, polyamideimide, polyethersulfone and polyetherimide are preferred; and polyamide, polyimide and polyamideimide are more preferred. The heat-resistant resin is more preferably a nitrogen-containing aromatic polymer, such as aromatic polyamide (para-oriented aromatic polyamide, meta-oriented aromatic polyamide), aromatic polyimide and aromatic polyamideimide, still more preferably an aromatic polyamide, and yet still more preferably a para-oriented aromatic polyamide (hereinafter, referred to as "para-aramide"). In addition, the heat-resistant resin also includes poly-4-methylpentene-1, and a cyclic olefin-based polymer. By using such a heat-resistant resin, the heat resistance can be enhanced, i.e. the thermal film rupture temperature can be raised.

The thermal film rupture temperature depends on the types of heat-resistant resin, and is selected and used on the basis of the situation and the purpose of the use thereof. The thermal film rupture temperature is usually 160° C. or more. The thermal film rupture temperature can be controlled to about 400° C. in the case of use of the above-described nitrogen-containing aromatic polymer, to about 250° C. in the case of use of poly-4-methylpentene-1, and to about 300° C. in the case of use of a cyclic olefin-based polymer, as the heat resistant resin, respectively. The thermal film rupture temperature can be controlled to, for example, 500° C. or more in the case of use of a heat-resistant porous layer formed from an inorganic powder.

The para-aramide is obtained by condensation polymerization of a para-oriented aromatic diamine and a para-oriented aromatic dicarboxylic acid halide, and is substantially composed of a repeating unit where the amide bond is bonded at the para-position or equivalently oriented position of the aromatic ring (for example, the oriented position extending coaxially or in parallel to the opposite direction, such as 4,4'-biphenylene, 1,5-naphthalene, and 2,6-naphthalene). The para-aramide includes a para-aramide having a para-oriented-type and quasi-para-oriented-type structures. Specific examples thereof include poly(paraphenyleneterephthalamide), poly(parabenzamide), poly(4,4'-benzanilideterephthalamide), poly(paraphenylene-4,4'-biphenylenedicarboxylic acid amide), poly(paraphenylene-2,6-naphthalenedicarboxylic acid amide), poly(2-chloroparapheyleneterephthalamide), and paraphenyleneterephthalamide/2,6-dichloroparaphenyleneterephthalamide copolymer.

The aromatic polyimide is preferably a wholly aromatic polyimide produced by condensation polymerization of an aromatic diacid anhydride and an aromatic diamine. Specific examples of the diacid anhydride include pyromellitic dianhydride, 3,3',4,4'-diphenylsulfonetetracarboxylic dianhydride, 3,3',4,4'-benzophenonetetracarboxylic dianhydride, 2,2'-bis(3,4-dicarboxyphenyl)hexafluoropropane, and 3,3',4,4'-biphenyltetracarboxylic dianhydride. Examples of the diamine include oxydianiline, para-phenylenediamine, benzophenonediamine, 3,3'-methylenedianiline, 3,3'-diaminobenzophenone, 3,3'-diaminodiphenylsulfone, and 1,5'-naphthalenediamine. A polyimide soluble in a solvent may be suitably used. Examples of such a polyimide include a polyimide as a polycondensate of 3,3',4,4'-diphenylsulfonetetracarboxylic dianhydride with an aromatic diamine.

Examples of the aromatic polyamideimide include those obtained by condensation polymerization of an aromatic dicarboxylic acid and an aromatic diisocyanate, and those obtained by condensation polymerization of an aromatic diacid anhydride and an aromatic diisocyanate. Specific examples of the aromatic dicarboxylic acid include isophthalic acid and terephthalic acid. Specific examples of the aromatic diacid anhydride include trimellitic anhydride. Specific examples of the aromatic diisocyanate include 4,4'-diphenylmethane diisocyanate, 2,4-tolylene diisocyanate, 2,6-tolylene diisocyanate, ortho-tolylene diisocyanate and m-xylylene diisocyanate.

When the heat-resistant porous layer contains a heat-resistant resin, the heat-resistant porous layer may contain one or more types of fillers. The filler that may be contained in the heat-resistant porous layer may be any one selected from an organic powder, an inorganic powder and a mixture thereof. The average particle diameter of the particle constituting the filler is preferably from 0.01 to 1 μm. Examples of the shape of the filler include an approximately spherical shape, a plate shape, a columnar shape, an acicular particle, a whisker shape and a fibrous shape, and any particles of these shapes may be used. The filler is preferably an approximately spherical particle due to ease in forming uniform pores. The approximately spherical particles include particles having an aspect ratio (longer diameter of particle/shorter diameter of particle) in the range of from 1 to 1.5. The aspect ratio of particles can be determined using an electron microscope.

The organic powder as the filler includes a powder composed of an organic material, such as a homopolymer of or a copolymer of two or more kinds of styrene, vinyl ketone, acrylonitrile, methyl methacrylate, ethyl methacrylate, glycidyl methacrylate, glycidyl acrylate and methyl acrylate; a fluororesin, such as polytetrafluoroethylene, tetrafluoroethylene-hexafluoropropylene copolymer, tetrafluoroethylene-ethylene copolymer and polyvinylidene fluoride; a melamine resin; a urea resin; a polyolefin; and polymethacrylate. The organic powders may be used solely, or in admixture of two or more. Among the organic powders, a polytetrafluoroethylene powder is preferred in view of chemical stability.

Examples of the inorganic powder as the filler include a powder composed of an inorganic material, such as metal oxide, metal nitride, metal carbide, metal hydroxide, carbonate and sulfate. Among those, a powder composed of an inorganic material having a small conductivity can be preferably used. Specific examples thereof include a powder composed of alumina, silica, titanium dioxide, barium sulfate, or calcium carbonate. The inorganic powders may be used solely, or in admixture of two or more. Among the inorganic powders, an alumina powder is preferred in view of chemical stability. It is preferred that all of the particles constituting the filler be an alumina particle, and more preferred that all of the particles constituting the filler be an alumina particle, and a part or all thereof are an approximately spherical alumina particle. Incidentally, when the heat-resistant porous layer is formed from an inorganic powder, the above inorganic powder can be used, optionally along with a binder if required.

When the heat-resistant porous layer contains a heat-resistant resin, the content of the filler in the heat-resistant porous layer varies depending on the specific gravity of the material of the filler. For example, in the case where all of the particles constituting the filler are alumina particles, the weight of the filler is usually from 5 to 95 parts by weight, preferably from 20 to 95 parts by weight, and more preferably from 30 to 90 parts by weight, assuming that the total weight of the heat-resistant porous layer is 100 parts by weight. These ranges can be appropriately set, depending on the specific gravity of the material of the filler.

(Porous Film)

In the porous laminate film, the porous film preferably has fine pores, and can shutdown. In this case, the porous film contains a thermoplastic resin. A thickness of the porous film is usually from 3 to 30 μm, preferably from 3 to 25 μm. The porous film has fine pores similarly to the heat-resistant porous layer, and the size of the pore is usually 3 μm or less, preferably 1 μm or less. A void content of the porous film is usually from 30 to 80 vol %, preferably from 40 to 70 vol %. When a temperature of nonaqueous electrolyte secondary battery exceeds a usual use temperature, the porous film can clog the fine pores due to softening of the thermoplastic resin constituting the porous film.

The thermoplastic resin contained in the porous film includes a resin that is softened at from 80 to 180° C., and a thermoplastic resin which does not dissolve in the electrolytic solution of a nonaqueous electrolyte secondary battery may be selected. Specific examples of the thermoplastic resin include a polyolefin resin, such as polyethylene and polypropylene, and a thermoplastic polyurethane resin. A mixture of two or more of these resins may be used. In order to activate a shutdown by softening at a lower temperature, the thermoplastic resin preferably contains polyethylene. The polyethylene specifically includes a polyethylene, such as a low-density polyethylene, a high-density polyethylene and a linear polyethylene, and also includes an ultrahigh molecular-weight polyethylene having a molecular weight of one million or more. For further enhancing the piercing strength of the porous film, the thermoplastic resin preferably contains at least an ultrahigh molecular-weight polyethylene. In view of production of the porous film, it is sometimes preferred that the thermoplastic resin contain a wax composed of a polyolefin of low molecular-weight (weight average molecular weight of 10,000 or less).

The examples of a porous film containing a heat-resistant material which differs from that of the above-described porous laminate film include a porous film formed from a heat-resistant resin and/or an inorganic powder, and a porous film in which a heat-resistant resin and/or an inorganic powder is dispersed in a thermoplastic resin film of polyolefin resin, thermoplastic polyurethane resin or the like. The heat-resistant resin and the inorganic powder include ones described above.

<Sodium Secondary Battery of the Present Invention/Electrolytic Solution or Solid Electrolyte>

In the electrolytic solution usable in the sodium secondary battery of the present invention, the examples of the electrolyte include $NaClO_4$, $NaPF_6$, $NaAsF_6$, $NaSbF_6$, $NaBF_4$, $NaCF_3SO_3$, $NaN(SO_2CF_3)_2$, sodium salt of lower aliphatic carboxylate, and $NaAlCl_4$. A mixture of two or more thereof may be used. Among these, an electrolyte containing, at least one selected from the group consisting of $NaPF_6$, $NaAsF_6$, $NaSbF_6$, $NaBF_4$, $NaCF_3SO_3$ and $NaN(SO_2CF_3)_2$, which contain fluorine, is preferably used.

In the electrolytic solution usable in the sodium secondary battery of the present invention, examples of the organic solvent, which can be used, include carbonates, such as propylene carbonate (PC), ethylene carbonate, dimethyl carbonate, diethyl carbonate, ethyl methyl carbonate, isopropyl methyl carbonate, vinylene carbonate, 4-trifluoromethyl-1,3-dioxolan-2-one, and 1,2-di(methoxycarbonyloxy)ethane; ethers, such as 1,2-dimethoxyethane, 1,3-dimethoxypropane, pentafluoropropylmethyl ether, 2,2,3,3-tetrafluoropropyldifluoromethyl ether, tetrahydrofuran, and 2-methyltetrahydrofuran; esters, such as methyl formate, methyl acetate, and γ-butyrolactone; nitriles, such as acetonitrile and butyronitrile; amides, such as N,N-dimethylformamide, and N,N-dimethylacetamide; carbamates, such as 3-methyl-2-oxazolidone; sulfur-containing compounds, such as sulfolane, dimethyl sulfoxide, and 1,3-propanesultone; and those obtained by introducing a fluorine substituent into the organic solvent above. Usually, two or more of the organic solvents are mixed and used.

A solid electrolyte may also be used in place of the electrolytic solution. Examples of the solid electrolyte which can be used include an organic polymer electrolyte, such as polyethylene oxide-based polymer, and polymer containing at least one or more of polyorganosiloxane chains or polyoxyalkylene chains. A so-called gel-type electrolyte holding a nonaqueous electrolyte solution in a polymer can also be used. The use of sulfide electrolyte such as $Na_2S$—$SiS_2$, $Na_2S$—$GeS_2$, and NASCON-type electrolyte such as $NaZr_2(PO_4)_3$ may also be used. When such a solid electrolyte is used, safety can be enhanced in some cases. In the case of using a solid electrolyte in the sodium secondary battery of the present invention, the solid electrolyte sometimes works as a separator, and in this case, a separator may not be necessary.

EXAMPLES

The present invention is described in greater detail below by referring to examples, but the present invention is not limited thereto by any means. Incidentally, unless otherwise indicated, a production method of an electrode and a test battery for a charge/discharge test, and a measurement method of powder X-ray diffraction are as follows.

(1) Production of Electrode (Positive Electrode)

A positive electrode active material, an acetylene black (produced by Denki Kagaku Kogyo Kabushiki Kaisha) as an electrically conductive material, and PVDF (PolyVinylidine DiFluoride Polyflon, produced by Kureha Corporation) as a binder were weighed so that a composition of positive electrode active material:electrically conductive material:binder may be 85:10:5 (by weight). Thereafter, the positive electrode active material and the acetylene black were thoroughly mixed in an agate mortar, an appropriate amount of N-methyl-2-pyrrolidone (NMP, produced by Tokyo Chemical Industry Co., Ltd.) was added to the mixture, PVDF was further added, and these were then uniformly mixed to form a slurry. The obtained slurry was applied on a 40 μm-thick aluminum foil as a current collector by using an applicator to a thickness of 100 μm of the slurry, and the aluminum foil having the applied slurry was placed in a drier and thoroughly dried by removing NMP to yield an electrode sheet. This electrode sheet was punched with a diameter of 1.5 cm by an electrode punch, and sufficiently fixed under pressure by a hand press to yield a positive electrode sheet.

(2) Production of Test Battery

The positive electrode sheet was placed in a recess of the bottom part of a coin cell (manufactured by Hohsen Corp.) by arranging the aluminum foil to face downward, and combined with a 1 M $NaClO_4$/PC (propylene carbonate) as an electrolyte, a polypropylene porous film (thickness: 20 μm) as a separator, and a sodium metal (produced by Aldrich Chemical Company, Inc.) as a negative electrode to produce a test battery. Assembling of the test battery was performed in a glove box under an argon atmosphere.

(3) Powder X-Ray Diffraction Measurement

In the present invention, the measurement for obtaining an X-ray diffraction pattern was performed under the following conditions by using a powder X-ray diffraction measuring apparatus, Model RINT2500TTR, manufactured by Rigaku Corporation.

X-ray: CuKα
Voltage-current: 40 kV-140 mA
Measuring angle range: 2θ=10-90°
Step: 0.02°
Scan speed: 4°/min
Divergence slit width: (DS) 1°
Scattering slit width: (SS) 1°
Receiving slit width: (RS) 0.3 mm Example 1

(1) Synthesis of Positive Electrode Active Material ($NaFePO_4$)

Sodium carbonate ($Na_2CO_3$), iron oxalate dihydrate ($FeC_2O_4 \cdot 2H_2O$) and diammonium hydrogenphosphate (($NH_4)_2HPO_4$) were weighed in amounts so that a sodium (Na):iron (Fe):phosphorus (P) molar ratio may be 1:1:1, and mixed in an agate mortar over 20 minutes. The obtained uncalcined sample was placed in an alumina-made crucible, and a preliminarily calcination thereof was performed in an electric furnace at 450° C. over 10 hours while flowing a nitrogen gas at a flow rate of 2 liters/min.

The sample after the preliminary calcination was pulverized in an agate mortar over 20 minutes. Thereafter, a main calcination thereof was performed in an electric furnace at 800° C. over 24 hours while again flowing a nitrogen gas at a flow rate of 2 liters/min, and a pulverization was performed with a ball mill to produce a positive electrode active material of Example 1.

(2) Powder X-Ray Diffraction Analysis

FIG. 1 shows the result (X-ray diffraction pattern) of the powder X-ray diffraction measurement of the positive electrode active material of Example 1. According to FIG. 1, it was found that the positive electrode active material obtained in Example 1 is almost a single phase of high-crystallinity olivine-type sodium iron phosphate. Also, in FIG. 1, the maximum peak was a peak)($2\theta=34.8°$ of the (031) plane of olivine-type sodium iron phosphate ($NaFePO_4$), and the half-value width of the peak was 0.09°. Furthermore, an $I/I_0$ value was 0 where the signal intensity at the peak of $2\theta=34.8°$ is $I_0$ and the signal intensity at the peak of $2\theta=34.2°$ is I.

(3) Evaluation of Charge/Discharge Performance as Positive Electrode Active Material of Sodium Secondary Battery A test battery was produced by using the positive electrode active material of Example 1 as the positive electrode active material for sodium secondary batteries, and subjected to a constant current charge/discharge test.

Figure 2:
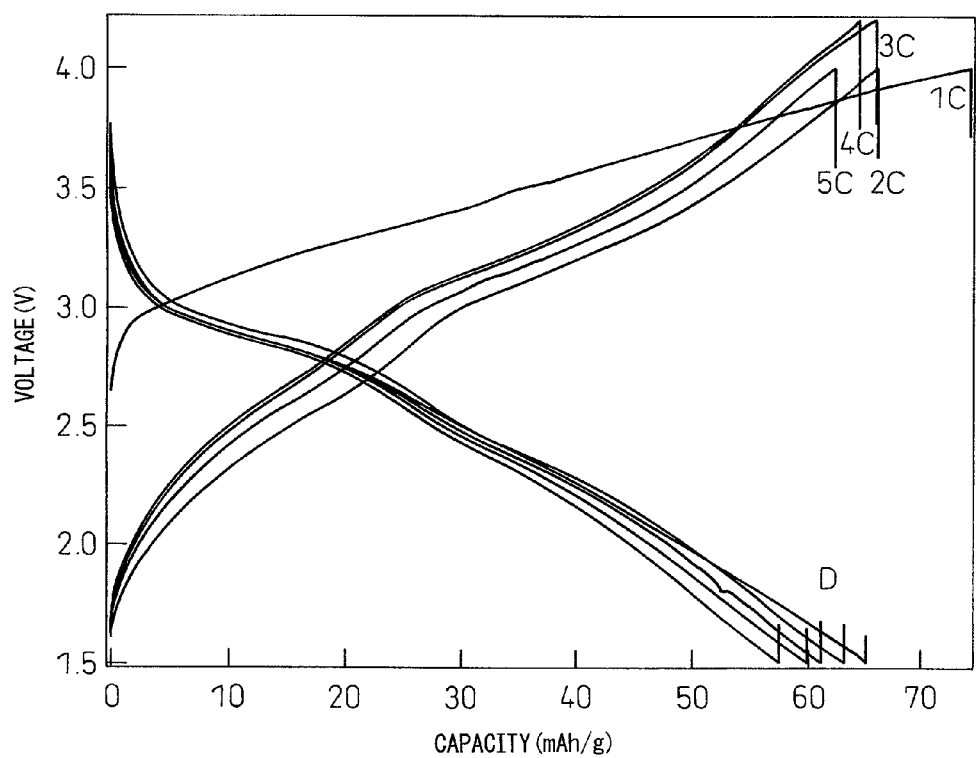
FIG. 2 A view showing the results of charge/discharge performance evaluation in Example 1.

The charge was performed by CC (constant current) charge at a 0.05 C rate (a rate that requires 20 hours for full charge) up to 4.2 V from the rest potential. The discharge was performed by CC discharge at a 0.05 C rate, and was cut off at a voltage of 1.5 V. FIG. 2 shows the results obtained. In FIG. 2, C1 to C5 indicate charge curves of 1st to 5th charges, respectively, and D indicates discharge curves of 1st to 5th discharges.

Example 2

(1) Synthesis of Positive Electrode Active Material ($NaFePO_4$)

Figure 7:
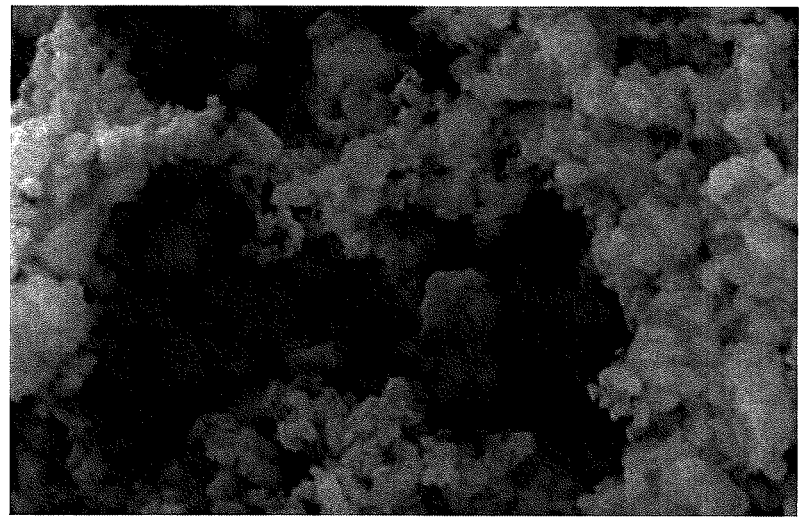
FIG. 7 An SEM observation photograph of the positive electrode active material in Example 2.

A positive electrode active material of Example 2 was synthesized in the same manner as in Example 1 except for performing the preliminary calcination at 750° C. and setting the flow rate of nitrogen gas in the preliminary calcination and main calcination to 5 liters/min. FIG. 7 shows the SEM observation photograph of the positive electrode active material obtained.

(2) Powder X-Ray Diffraction Analysis

FIG. 1 shows the result (X-ray diffraction pattern) of the powder X-ray diffraction measurement of the positive electrode active material of Example 2. According to FIG. 1, it was found that the positive electrode active material obtained in Example 2 is almost a single phase of high-crystallinity olivine-type sodium iron phosphate. Also, in FIG. 2, the maximum peak was a peak)($2\theta=34.8°$ of the (031) plane of olivine-type sodium iron phosphate ($NaFePO_4$), and the half-value width of the peak was 0.1°. Furthermore, an $I/I_0$ value was 0.07 where the signal intensity at the peak of $2\theta=34.8°$ is $I_0$ and the signal intensity at the peak of $2\theta=34.2°$ is I.

Figure 3:
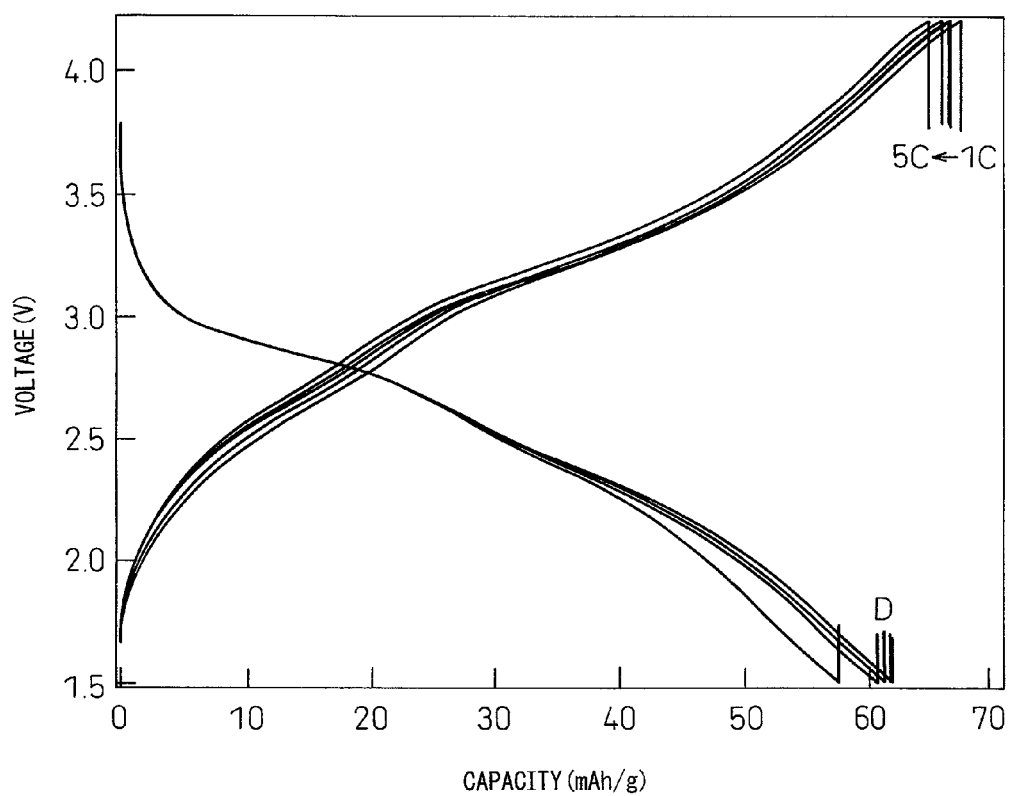
FIG. 3 A view showing the results of charge/discharge performance evaluation in Example 2.

(3) Evaluation of Charge/Discharge Performance as Positive Electrode Active Material of Sodium Secondary Battery A test battery was produced in the same manner as in Example 1 by using the positive electrode active material of Example 2, and subjected to a constant current charge/discharge test. FIG. 3 shows the results obtained. In FIG. 3, C1 to C5 indicate charge curves of 1st to 5th charges, respectively, and D indicates discharge curves of 1st to 5th discharges.

Comparative Example 1

(1) Synthesis of Material

A material of Comparative Example 1 was synthesized in the same manner as in Example 1 except for using diiron trioxide ($Fe_2O_3$) in place of iron oxalate dihydrate ($FeC_2O_4 \cdot 2H_2O$) and performing not a two-step calcination but a one-step calcination at a temperature of 750° C. over 8 hours while flowing a nitrogen gas at 5 liters/min in an electric furnace.

(2) Powder X-Ray Diffraction Analysis

Figure 4:
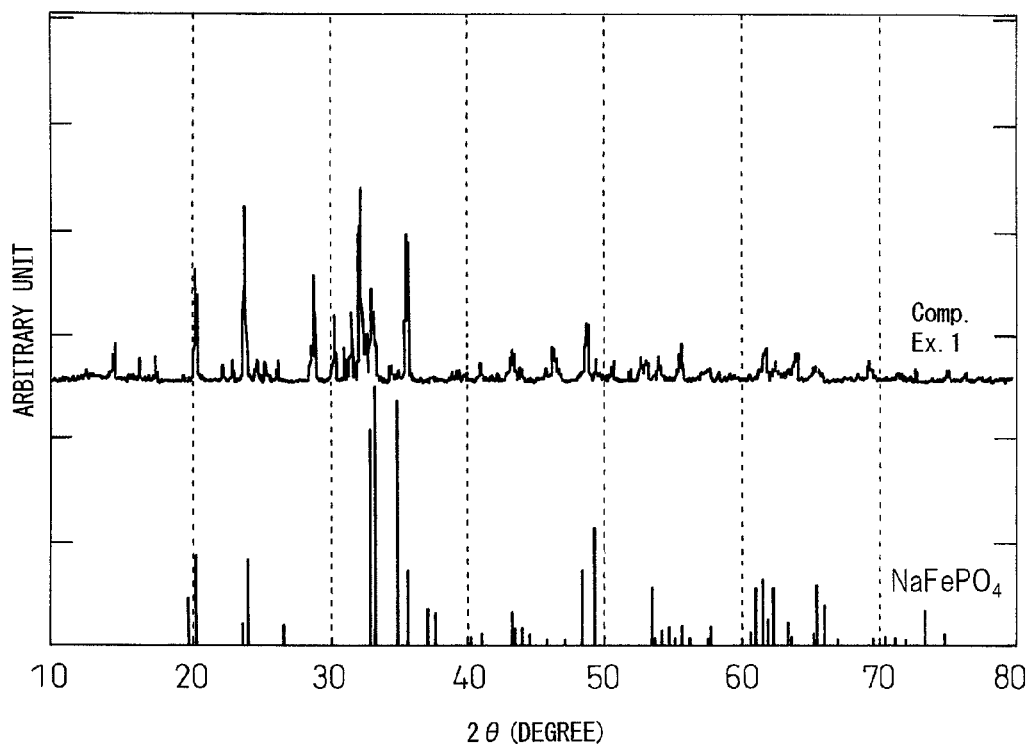
FIG. 4 An X-ray diffraction pattern of the material in Comparative Example 1.

FIG. 4 shows the result (X-ray diffraction pattern) of the powder X-ray diffraction measurement of the material of Comparative Example 1. In FIG. 4, it was found that the maximum peak is assigned to $Na_3Fe_2(PO_4)_3$, and that the main phase of the material synthesized in Comparative Example 1 is not olivine-type sodium iron phosphate ($NaFePO_4$) but $Na_3Fe_2(PO_4)_3$.

Comparative Example 2

(1) Synthesis of Material

Figure 8:
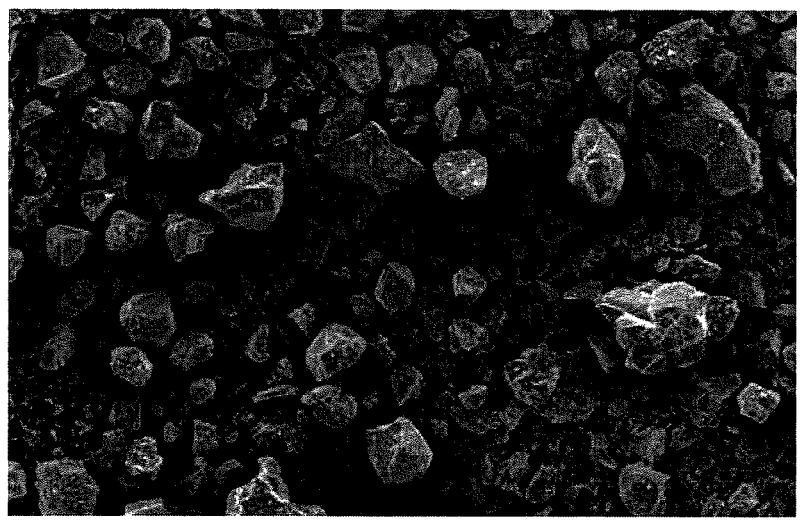
FIG. 8 An SEM observation photograph of the material in Comparative Example 2.

A material of Comparative Example 2 was synthesized in the same manner as in Example 1 except for performing not a two-step calcination but a one-step calcination at a temperature of 750° C. over 24 hours while flowing a nitrogen gas at 5 liters/min in an electric furnace. FIG. 8 shows the SEM observation photograph of the material obtained.

(2) Powder X-Ray Diffraction Analysis

Figure 5:
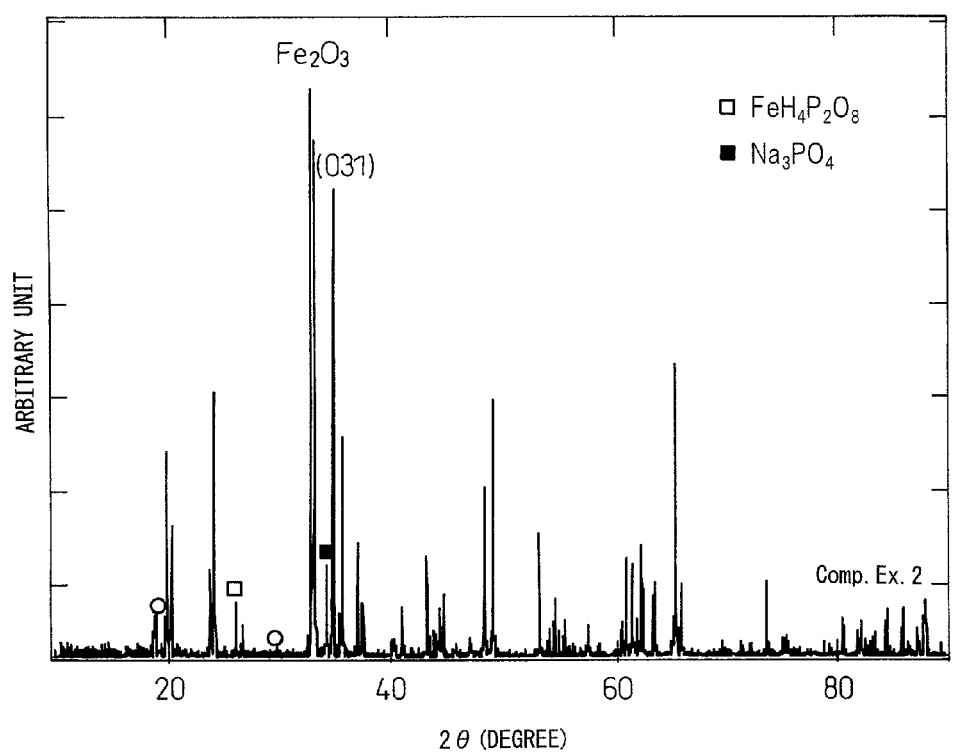
FIG. 5 An X-ray diffraction pattern of the material in Comparative Example 2.

FIG. 5 shows the result (X-ray diffraction pattern) of the powder X-ray diffraction measurement of the material of Comparative Example 2. In FIG. 5, it was found that the maximum peak is assigned to $Fe_2O_3$, and that the main phase of the material synthesized in Comparative Example 2 is not olivine-type sodium iron phosphate ($NaFePO_4$) but $Fe_2O_3$. That is, FIG. 5 reveals that the maximum peak of the material of Comparative Example 2 is not a peak of the (031) plane of olivine-type sodium iron phosphate ($NaFePO_4$).

(3) Evaluation of Charge/Discharge Performance as Positive Electrode Active Material of Sodium Secondary Battery A test battery was produced by using the material of Comparative Example 2 as the positive electrode active material, and subjected to a constant current charge/discharge test in the same manner as in Example 1. As a result, the discharge capacity for 1st discharge was as very small as 2 mAh/g. The discharge capacity was more decreased as charge/discharge was repeated, and the discharge capacity for 5th discharge was almost 0 mAh/g.

Comparative Example 3

(1) Synthesis of Material

A material of Comparative Example 3 was synthesized in the same manner as in Example 1 except for performing not a two-step calcination but a one-step calcination at a temperature of 800° C. over 24 hours while flowing a nitrogen gas at 5 liters/min in an electric furnace.

(2) Powder X-Ray Diffraction Analysis

Figure 6:
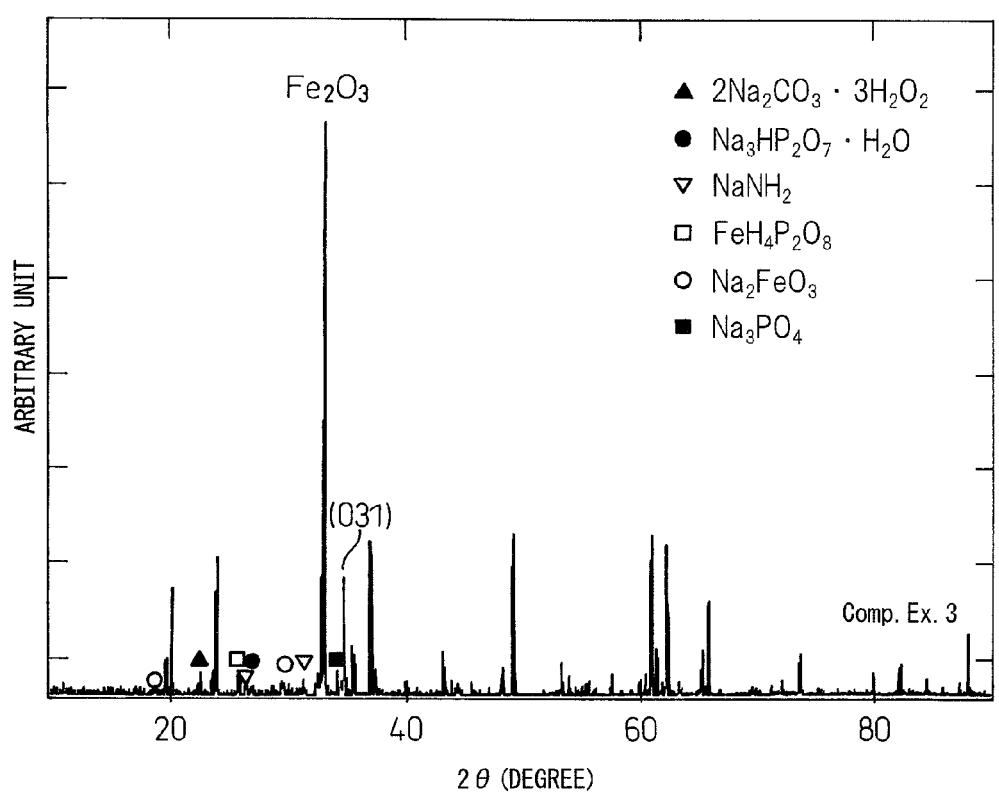
FIG. 6 An X-ray diffraction pattern of the material in Comparative Example 3.

FIG. 6 shows the result (X-ray diffraction pattern) of the powder X-ray diffraction measurement of the material of Comparative Example 3. In FIG. 6, it was found that the maximum peak is assigned to $Fe_2O_3$, and that the main phase of the material synthesized in Comparative Example 3 is not olivine-type sodium iron phosphate ($NaFePO_4$) but $Fe_2O_3$. That is, FIG. 6 reveals that the maximum peak of the material of Comparative Example 3 is not a peak of the (031) plane of olivine-type sodium iron phosphate ($NaFePO_4$).

(3) Evaluation of Charge/Discharge Performance as Positive Electrode Active Material of Sodium Secondary Battery A test battery was produced by using the material of Comparative Example 3 as the positive electrode active material, and subjected to a constant current charge/discharge test in the same manner as in Example 1. As a result, the discharge capacity for 1st discharge was as very small as 1 mAh/g. The discharge capacity was more decreased as charge/discharge was repeated, and the discharge capacity for 5th discharge was almost 0 mAh/g.

Production Example 1

Production of Porous Laminate Film (1) Production of Slurry of Applying for Heat-Resistant Porous Layer After dissolving 272.7 g of calcium chloride in 4,200 g of N-methyl-2-pyrrolidone (NMP), 132.9 g of para-phenylenediamine was added and completely dissolved therein. To the obtained solution, 243.3 g of terephthalic acid dichloride was gradually added to effect the polymerization, and thereby obtain a para-aramide. The obtained solution was further diluted with NMP to obtain a para-aramide solution having a concentration of 2.0 wt %. To 100 g of the obtained para-aramide solution, 2 g of a first alumina powder (Alumina C, produced by Nippon Aerosil Co., Ltd., average particle diameter: 0.02 μm) and 2 g of a second alumina powder (Sumicorundum AA03, produced by Sumitomo Chemical Co., Ltd., average particle diameter: 0.3 μm), as a filler in total of 4 g, were added and mixed. The resulting mixture was subjected to a nanomizer three times, filtered with a 1,000-mesh metal screen, and defoamed under reduced pressure to produce a slurry of applying for heat-resistant porous layer. The amount of the alumina powder (filler) was 67 wt %, based on the total weight of the para-aramide and alumina powder.

(2) Production of Porous Laminate Film

As for a porous film, a polyethylene porous film (film thickness of 12 μm, air permeability of 140 seconds/100 ml, average pore diameter of 0.1 μm, void content of 50%) was used. The polyethylene porous film above was fixed on a 100 μm-thick PET film, and the slurry of applying for heat-resistant porous layer was applied on the porous film by a bar coater manufactured by Tester Sangyo Co,. Ltd. The coated porous film on the PET film was, while maintaining the integrity, dipped in water, which is a poor solvent, to precipitate a para-aramide porous film (heat-resistant porous layer). After that, the solvent was dried to yield a porous laminate film in which a heat-resistant porous layer and a porous film were laminated.

(3) Evaluation of Porous Laminate Film

The thickness of the porous laminate film was 16 μm, and the thickness of the para-aramide porous layer (heat-resistant porous layer) was 4 μm. The air permeability of the porous laminate film was 180 seconds/100 ml, and the void content was 50%. The cross-section of the heat-resistant porous layer in the porous laminate film was observed by a scanning electron microscope (SEM), as a result, the heat-resistant porous layer was found to have relatively small pores of approximately 0.03 to 0.06 μm and relatively large pores of approximately 0.1 to 1 μm.

Evaluations of the porous laminate film were performed as in the following (A) to (C).
(A) Thickness Measurement
The thicknesses of the porous laminate film and the porous film were measured in accordance with JIS standards (K7130-1992). The thickness of the heat-resistant porous layer was determined by subtracting the thickness of the porous film from the thickness of the porous laminate film.
(B) Measurement of Air Permeability by Gurley Method
The air permeability of the porous laminate film was measured based on JIS P8117 by a digital-timer type Gurley densometer manufactured by Yasuda Seiki Seisakusho, Ltd.
(C) Void Content
The obtained porous laminate film sample was cut into a square shape which is 10 cm on each side, and the weight W (g) and the thickness D (cm) were measured. The weight (Wi (g)) of each layer in the sample was determined, the volume of each layer was determined from Wi and the true specific gravity (true specific gravity i ($g/cm^3$)) of each layer, and the void content (vol %) was determined according to the following formula:

Void content(vol %)=100×{1−($W$1/true specific gravity 1+$W$2/true specific gravity 2+ . . . +$Wn$/true specific gravity $n$)/(10×10×$D$)}

When the porous laminate film obtained by Production Example is used as a separator in the sodium secondary batteries of the above Examples, the sodium secondary batteries can more successfully prevent thermal film rupture.

The present specification explains the present invention mainly regarding the case where sodium is used as an alkali metal and iron is used as a transition metal, in olivine-type phosphate. It is also within the scope of the present invention to use the other alkali metals such as lithium and potassium in place of or in addition to sodium, and to use the other transition metals such as manganese and nickel in place of or in addition to iron. Therefore, when lithium is used as an alkali metal in olivine-type phosphate, the positive electrode active material of the present invention can be used as a positive electrode active material of a lithium secondary battery.

The invention claimed is:
1. A positive electrode active material comprising an olivine-type phosphate represented by the following formula (I), wherein the maximum peak of the positive electrode active material in an X-ray diffraction pattern obtained using a CuKα ray is the peak of the (031) plane of the olivine-type phosphate, and the half-value width of the peak is 1.5° or less:

$$A_aM_bPO_4 \quad\quad\quad (I)$$

wherein A comprises sodium, M represents one or more elements selected from among transition metals, a is 1, and b is 1.

2. The positive electrode active material according to claim 1, wherein M comprises at least iron.

3. The positive electrode active material according to claim 2, wherein M is iron.

4. The positive electrode active material according to claim 3, wherein the positive electrode active material has a peak at $2\theta=34.8°$ in an X-ray diffraction pattern obtained using a CuKα ray, and an $I/I_0$ value is 0.5 or less where the signal intensity at said peak is $I_0$ and the signal intensity at $2\theta=34.2°$ is I.

5. A positive electrode for sodium secondary batteries, comprising the positive electrode active material according to claim 2.

6. A sodium secondary battery comprising the positive electrode for sodium secondary batteries according to claim 5.

7. The sodium secondary battery according to claim 6 further comprising a negative electrode comprising a mixture of a carbonaceous material and a binder.

8. The sodium secondary battery according to claim 6 further comprising a separator.

9. The sodium secondary battery according to claim 8, wherein the separator is a separator comprising a porous laminate film in which a heat-resistant porous layer comprising a heat-resistant resin and a porous film comprising a thermoplastic resin are laminated.

* * * * *